US005573244A

United States Patent [19]

Mindes

[11] Patent Number: 5,573,244

[45] Date of Patent: Nov. 12, 1996

[54] SYSTEM AND METHOD FOR WAGERING AT FIXED HANDICAPS AND/OR ODDS ON A SPORTS EVENT

[75] Inventor: Barry M. Mindes, Wayne, N.J.

[73] Assignee: International Sports Wagering, Inc., Little Falls, N.J.

[21] Appl. No.: 203,213

[22] Filed: Feb. 28, 1994

[51] Int. Cl.[6] .......... G06F 155/00; A63F 9/24

[52] U.S. Cl. .......... 463/26; 463/40

[58] Field of Search .......... 364/412, 410, 364/411; 273/138 A, 138 R; 235/380, 375

[56] References Cited

U.S. PATENT DOCUMENTS

| | | | |
|---|---|---|---|
| 3,697,698 | 10/1972 | Oswald et al. | 179/15 A |
| 4,001,551 | 1/1977 | Hirsimake | 235/70 |
| 4,108,361 | 8/1978 | Krause | 235/375 |
| 4,141,548 | 2/1979 | Everton | 273/1 E |
| 4,467,424 | 8/1984 | Hedges et al. | 364/412 |
| 4,494,197 | 1/1985 | Troy et al. | 364/412 |
| 4,540,174 | 9/1985 | Coppock | 273/138 R |
| 4,592,546 | 6/1986 | Fascenda et al. | 273/1 E |
| 4,775,937 | 10/1988 | Bell | 362/412 |
| 4,882,473 | 11/1989 | Bergeron et al. | 235/380 |
| 5,018,736 | 5/1991 | Pearson et al. | 273/439 |
| 5,027,102 | 6/1991 | Sweeny | 340/323 R |
| 5,059,127 | 10/1991 | Lewis et al. | 434/353 |
| 5,073,931 | 12/1991 | Audebert et al. | 380/23 |
| 5,120,076 | 6/1992 | Luxenberg et al. | 273/439 |
| 5,275,400 | 1/1994 | Weingardt et al. | 273/85 CP |
| 5,324,035 | 6/1994 | Morris et al. | 273/138 A |

*Primary Examiner*—Gail O. Hayes
*Assistant Examiner*—Charles R. Kyle
*Attorney, Agent, or Firm*—Pennie & Edmonds

[57] ABSTRACT

A data processing system and method is described that allows a betting "house" to maintain a betting pool on a contest by controlling the terms (the betting odds and/or handicaps) for the contestants so that bettors are encouraged to place bets that will bring the betting pool (the "book") into balance. The data processing system and method provide for maintaining a betting pool having certain betting terms. In particular, the data processing system, which includes a central processor and a storage device, calculates an imbalance of the betting pool, determines on the basis of predetermined criteria whether to change the betting terms, and changes the betting terms accordingly.

36 Claims, 5 Drawing Sheets

SYSTEM AND METHOD FOR WAGERING AT FIXED HANDICAPS AND/OR ODDS ON A SPORTS EVENT

BACKGROUND OF THE INVENTION

Field of the Invention

This invention relates to a system and method that automates sports betting and allows betting to continue while an event is in progress.

Sports Betting

Legalized gambling on sports events, commonly referred to as "sports betting," is an organized activity in many parts of the world. The entity that accepts the wager (the house) does not intend to enter into the wager, but merely to serve as a broker, matching players (bettors or gamblers) betting on the opposing contestants in an event such that the funds that the house must pay out to the winners equals the amount gained from the losers, less the commissions the house charges for brokering the transactions. The system and method of the present invention is applicable to betting on any event in which two contestants are competing to win. The event need not be a sporting contest, but may be any type of contest, such as an election, etc.

Establishing Betting Terms

It frequently happens in a contest that one contestant is more highly regarded by players (is the "favorite") and therefore is likely to have a greater sum wagered on its winning than is wagered on the other contestant (the "underdog"). If the house were to allow that to happen without some form of financial counterbalancing, then should the favorite win, the funds gained from losses on the underdog would be insufficient to pay the players who had bet upon the favorite. The house would in that case have to pay some of the players backing the favorite with its own funds. Of course, should the underdog win, the house would be left with a surplus after taking its commissions and paying the winners. In either case, the house would have an interest in the outcome of the contest and therefore be involved in the wager, instead of being solely a broker.

The house seeks to induce equal wagering on each contestant by giving either a handicap (the favorite must win by some margin) or odds (a greater than equal payout on winning to the underdog or a lesser one to the favorite) on the outcome of the event. For example, if a handicap of 5 points were given, the favorite would have to win by more than 5 points for the players betting on the favorite to succeed with their bets. Should the favorite win by fewer than 5 points (in this example), those who bet on the favorite would lose. If the favorite wins by exactly the handicap margin, house rules dictate the result. (It could result in the player losing, the player winning, or the wager being voided.) For simplicity in subsequent discussion herein, such bets will be considered as ties and therefore void.

In the case of an odds payout, the favorite, upon winning, would receive only a percentage of the amount paid if the underdog won. For example, if the odds were two to three (2/3) on the favorite, a wager of $300 would return winnings of $200. Correspondingly, if the odds on the underdog were three to two (3/2), a winning wager would pay $300 for each $200 bet. It is unnecessary, however, for the odds to be reciprocal (2/3 and 3/2 in the previous example); there could be separate odds on each contestant should that be necessary for the house to attempt to balance the pool or increase their profit. In all cases, a house commission could be charged to the players, either as a deduction from the winning payout or as a charge up-front to all players (a betting fee).

Both a handicap and odds serve the function of seeking to equalize the house's gains and losses, but by differing means. With a handicap, the house seeks to make the likelihood of each contestant's winning, and therefore the likelihood of players wagering on each contestant, equal. With odds, the house takes the position that if the contestants were to engage in a large number of contests, the odds reflect the percentage of the time that each contestant would win. For example, with 2 to 1 odds, the house estimates that if the two contestants were to compete many times, the favorite would win twice as often. This means that on a random basis the favorite is twice as likely to win any given contest. Thus, should the house be accurate in establishing the proper odds or handicap, and presuming that the players act rationally, the total sums wagered on each contestant will be just sufficient to pay the winners, without the house having any sum at risk regardless of the outcome of the sports event. This equalization is referred to as "balancing the book."

The culture of sports betting is such that the player wants to know the odds or handicap (point spread) of the wager at the time it is placed (fixed terms betting). While these may subsequently change as the house attempts to balance its book, the terms for a previously placed bet remain the same. Thus, different players who placed bets on one contestant over a period of time could have different betting terms (odds or point spread). This is different than the situation in race track betting where a parimutuel system is used, where all wagers on the same contestant have the same terms, and the player does not know the odds he will receive when he makes his wager, but learns the odds only after all wagers have been placed.

Whether odds or a handicap is used depends upon the type of sporting event under consideration. It usually devolves from tradition and is based upon experience with results in that sport. For example, in basketball, a given stronger team might be expected to win 70% of the time over a given weaker team, but the average margin of victory might be expected to be only 5 or 6 points. In that case, a relatively small handicap could serve to equalize the contest, whereas the odds would be quite large (over 2 to 1 in this case). A similar situation exists in football. In baseball, however, scores are much more variable but the underdog is usually not much less likely to win than the favorite. In that case, a relatively small difference in odds, say 7 to 5, and almost always less than 2 to 1, will equalize the contest. In addition, in sports such as boxing, there is no convenient handicap and so odds are used. Most sports have a traditional means of balancing the book.

Sometimes the house's initial handicap or odds will not lead to a balanced book because the players do not agree with the house's assessment. In the case of odds, the house will attempt odds equalization, in which the house changes the odds to bring the book into balance. This is usually possible, but in extreme cases the house must resort to refusing to accept wagers on one of the contestants and hope that the bets on the other one will eventually balance the book. The house can also make countervailing wagers with other houses (lay off bets) to balance its book. Laying off bets is the sports betting equivalent of reinsurance in the insurance industry.

It is more difficult to balance a book in the case of a point spread (handicap). The point spread can be changed, e.g., a 5 point handicap can become 6 points, 7 points, etc. But if the book is not in balance at a given point spread, balancing it by adding other point spreads such that the dollar total of all bets on one contestant over all point spreads equals the dollar total of all bets on the other contestant over all point spreads will not assure that the house has no exposure for every possible outcome of the event. To avoid having the house be at risk, the house can: (1) accept bets only on one contestant if the book is out of balance; (2) combine odds with the point spread; (3) have a different point spread for each contestant (e.g., Team A receives a handicap of 5 points but Team B must win by 8 points for players betting on B to be paid off, in which case the house pays out nothing if the team's scores differ by 6 or 7 points), so the house's increased profit potential over many events will compensate for any risk the house has with the unbalanced book; or (4) lay off bets. In any case, the house tries to take corrective action before the book gets substantially out of balance.

Increasing Sports Betting Profitability

The mechanics of sports betting, described above, do not address a principal drawback to the profitability of sports betting in a casino environment. The drawback arises because most sporting events upon which bets are made take several hours to complete. Because the bets are not decided until the contest is completed, the rate of return (or commission per hour) is quite low and, particularly in a casino where facilities are being utilized, sports betting has a relatively low profit margin.

Another deficiency of present sports betting as relates to operation in an organized environment is that the range of the types of bets which are available is restricted. The basic bets each involve selecting the winner with a given handicap. Occasionally there are other bets offered, such as total points scored, etc. However, gambling establishments generally prefer a much broader range of betting opportunities. For example, in horse racing, wagering can include: (1) bets on one horse finishing first, second, or third; (2) bets on two, three, or four horses finishing first and second, first, second, and third, or first, second, third, and fourth; (3) bets on the results of several races (parlays); etc.

The way to increase the profit margin in any brokerage business is to increase the number of transactions which produce commissions. The way this is done in horse racing (a specialized form of sports betting in which there are usually many contestants in each event) is to have multiple, sequential events (races). The winnings from each successful wager are available for subsequent wagers, which will again return commissions to the house. In addition, the many races and many bet types (win, place, show, exacta, parley, etc.) provide many opportunities to bet.

The rapid availability of winnings for subsequent bets is called "churning." It makes it possible for $1 or 2 million to be bet at a racetrack when the players who come to the racetrack have only about $500,000 initially available for wagering. This can be done because races are run at approximately ½ hour intervals and there are usually about 10 races per day, giving many opportunities for churning.

In other forms of sports betting, while there are numerous events to place bets upon, taking into account games in different time zones, there is usually no more than one chance per day to churn winnings.

A data processing system that addressed these deficiencies would be particularly useful.

SUMMARY OF THE INVENTION

The present invention provides a system and method that maintains a betting pool having certain betting terms. This system and method controls the terms (the betting odds and/or handicaps) for the contestants such that bettors are encouraged to place bets that will bring the betting pool (the "book") into balance. In this way, the entity which is accepting the bets minimizes its financial exposure from one or more betting pools being out of balance, and the pool balance(s) are maintained within a maximum percentage of the value of the pool(s) or below a maximum dollar amount. Such a system and method allows bets to be entered on multiple terminals, events to be displayed in conjunction with the acceptance of wagers, and the provision of a broad variety of bet types on an event. Use of the invention also enables a bet to have a present value and allows bets to be cashed prior to the completion of the event for their then fair market value. The invention can also be used to automate betting on any other event, such as the results of an election, in which two contestants are vying to win.

In particular, the system of the invention comprises a central processor means for processing data; a storage means for storing data; first means for calculating an imbalance of the betting pool; second means, responsive to the first means, for determining on the basis of predetermined criteria whether to change certain betting terms; and third means, responsive to the second means, for changing the betting terms.

The present invention overcomes most of the deficiencies that prevent sports betting from being a more profitable undertaking. A system and method according to the invention will (1) balance a sports betting book automatically to ensure staying within virtually any level of equality desired; (2) greatly extend the period over which betting is permitted; (3) encourage increased wagering by making a far larger range of possible wagers available; (4) increase the speed and efficiency of wagering so that operating costs are reduced; (5) permit betting on a range of point spreads so that it will no longer be as essential in balancing the book that the initial point spread set by the house reflects the views of the players as to the relative merits of the contestants; and (6) it will permit churning of winnings by allowing cashing of bets during the contest. Other objects and advantages of the present invention will be apparent to those of skill in this art.

Figure 1:
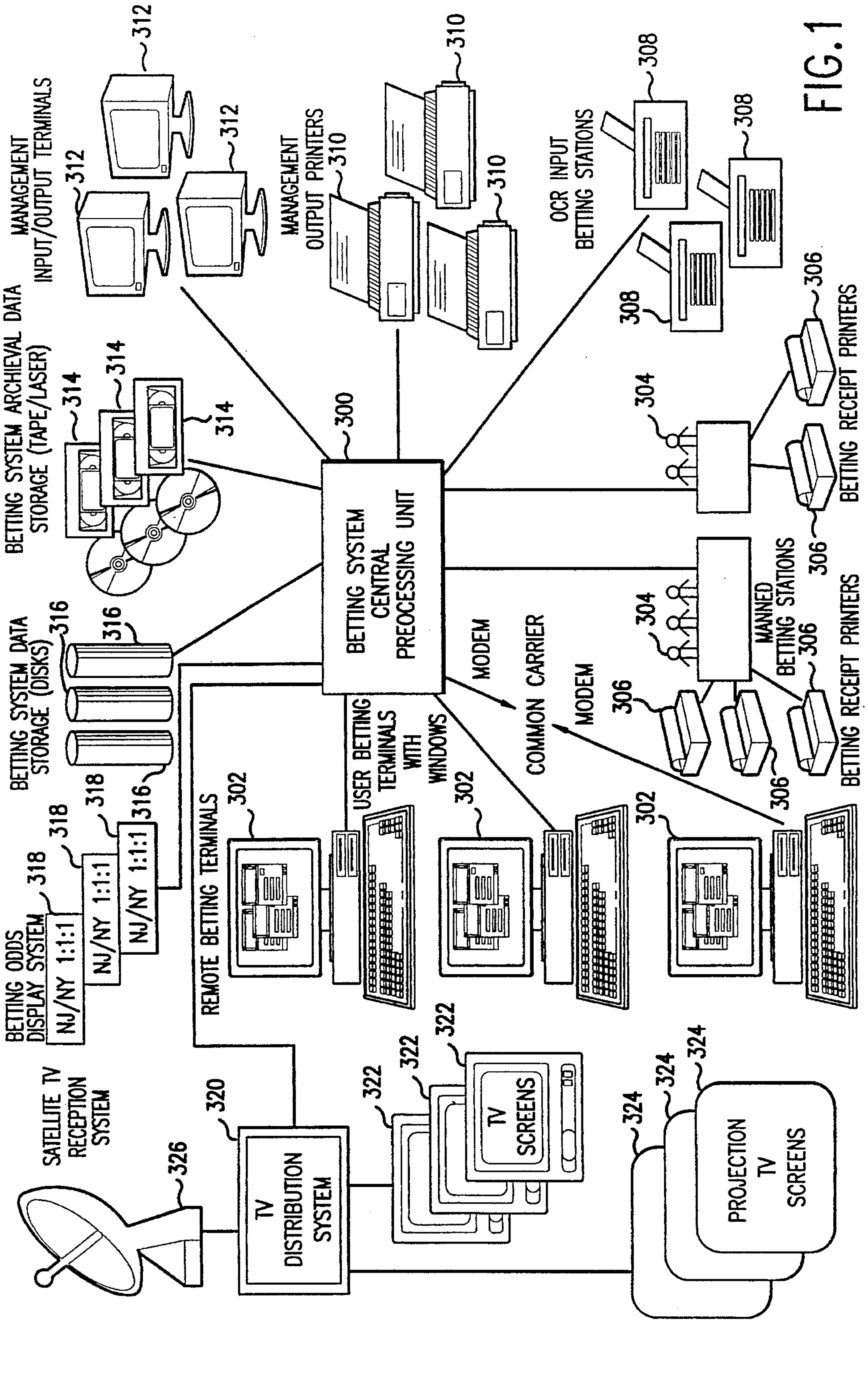
FIG. 1 is a schematic system diagram of a system according to the present invention.

FIGS. **4*a* and 4*b*** are flowcharts of pool processing in a preferred embodiment according to the present invention.

DESCRIPTION OF THE PREFERRED EMBODIMENTS

With sports betting as it is currently administered, the house selects terms which it believes will balance its book and then—until the start of the event—occasionally changes the terms if the book gets much out of balance. No bets are allowed after the event starts because it seems that if bets were allowed after the start of an event, the late bettors would have additional information on the probable outcome from the results of the already completed part of the contest. For example, scores could have been made, players could have been disqualified or injured, one team might appear to be playing on a lower level than usual on that day, etc.

But any advantage that seems to be gained by wagering after the start of a contest does not in reality exist if the book is constantly being balanced. In a system and method for sports betting according to the present invention, the terms for a wager are actually an offered price on the wager at a given time. The price offered is subject to alteration as conditions in the event and the perceptions of the players change. By placing a bet the player has "purchased" the wager at the offered price. When the book is in balance, players on opposite sides of the proposition have, in effect, made bets with each other, with the house brokering the transaction. When the book is out of balance, the house in effect becomes a player on the underfunded side of the transaction, having to place at risk the sum needed to balance the book.

An analogy can be made to the stock market. Trades on the stock market are made when bid and offered quotations are in agreement, the trade taking place at the price to which the parties agreed. On those occasions when it may not be possible temporarily to find traders on one side of the transaction, the market maker in the stock must buy or sell from his own account to accommodate unsatisfied trades and maintain an orderly market while prices are adjusting to reflect market sentiment. The market maker is at risk for the trades he himself must make. He can also benefit from a "spread" (difference) in buy and sell prices, which is analogous to having a spread in odds or handicap in sports betting.

In both the stock market and sports betting, offered prices respond to the sentiment of the players. It is as valid to allow wagering during a sports event as it is to trade stock while a business proceeds in its normal course and results are being announced as to performance. Following this logic, it is unnecessary to stop sports betting at the start of the event. The betting can continue during the contest almost until the end, with the odds varying to reflect the players' perceptions of the changing fortunes of the opposing contestants and the book continuing to be brought into balance.

Thus, by allowing betting after the start of a contest, not only is the wagering period greatly extended, but the changing fortunes of the teams will serve to expand betting opportunities. In practice, a single player might have many wagers in the same pool at different odds and even on different contestants. He might even have multiple wagers in different pools on the same game, made as the fortunes of the contestants changed.

The present invention provides a data processing system and method for maintaining a betting pool having certain betting terms. The system and method according to the present invention is preferably implemented using computer hardware and software. In a preferred configuration, an apparatus according to the invention connects to a network of input and output devices and displays. FIG. 1 is a schematic diagram of a typical system configuration according to this invention. The system comprises multiple elements, including a central processing unit 300 that maintains all pools, calculates odds, opens and closes all wagering on all pools, controls all input and output devices, produces all management and analysis reports and is the repository for all current and historical data on the wagering system. Central processing unit 300 may include one or more processors, storages, control units and communication devices. It interconnects to input and output devices such as remote betting terminals 302, optical character recognition (OCR); input betting stations 308, management output printers 310, management input/output terminals 312, betting system archival storage systems 314 (which typically are tape or laserdisc storage systems), betting system data storage systems 316 (which typically are disk storage systems), overhead betting odds display systems 318, and television (TV) distribution system 320, which provides output to television screens 322 and large screen projection television displays 324. The wagers are entered into the system both by players themselves at user terminals 302 and by tellers at managed betting stations 304 (using personal computer terminals, not shown), who may issue receipts via betting receipt printers 306. Each user terminal 302 preferably comprises a personal computer running a "windowing" system, with each contest upon which a user can bet displayed in a separate window along with information regarding betting terms for the bets the user has made, the user's account balance with the house, etc. User terminals 302 may also have associated printers (not shown).

User terminals 302 and PC terminals used at manned betting stations 304 could be local devices connected via hard wire, devices connected via a local area network, or devices connected via a common carrier network. User terminals 302 and PC terminals used at manned betting stations 304 are either keyboard or scanned input devices and user terminals 302 may also have cash or token payment capabilities. User terminals 302 may have displays which show odds, payouts, contestants, or other information having to do with the details of the wagers being placed. These and/or other terminals can optionally be used as payment terminals to reimburse winners. Input through the common carrier network could also come from telephone key pads, voice recognition equipment or virtually any compatible input device.

In the case of user terminals 302, one or several games in progress can be displayed in "windows" (partial screen displays) on the screen or occupy the entire screen, with wagering pools and betting terms being displayed simultaneously on the screen.

The system can also be used in conjunction with overhead betting odds displays 318 and large screen projection television displays 324. Overhead displays 318 show the changing betting terms in the various pools associated with the game being displayed on large screen displays 324. Betting terms could also be shown for other contests not being displayed.

The system can produce betting receipts for the players which are output on printers, such as betting receipt printers 306. These receipts can optionally include optical reading marks for rapid reading, counterfeit protection codes, player identification and the total of all wagers which are currently active for the player. There are also input devices (not shown) for entering scoring and the status of the game clock as they change during contests on which wagers are being taken, in order to keep the system and players current on the status of the event.

Computer Hardware, System Software, and Communications

Incorporated into a system according to the present invention are subsystems that use known hardware and software technology. If the system is being used in conjunction with television viewing, the television signals of events being shown during betting via TV distribution system 320 may be derived from satellite TV reception system 326, which can include commercially available satellite receiving systems, local television broadcast receivers and/or cable television transmission. The television signals are distributed to the various displays from the receivers via cable or wireless transmission which are driven by television distribution systems which use audio/video modulators, such as made by Blonder Tongue, Inc., to stack the television signals into standard channels for selection at the displays. Data for display, such as changing odds, are also modulated into standard channels for selection. Multiple events and/or data can be simultaneously shown on a display using standard computer "windowing" technology.

All of the subsystems are controlled by central processing unit 300, which also incorporates known hardware and software technology. For example, central processing unit 300 could, depending upon the specific size of an installation, use a 486, Pentium, RISC, minicomputer, or mainframe based processor. Units typically manufactured by companies such as IBM, DEC, Hewlett-Packard, and others, are entirely suitable. Similarly, disk storage systems from firms such as IBM and Maxtor, magnetic tape systems such as those from Storage Technology, and laser storage systems such as those from Sony are entirely adequate for the needs of the system.

The local entry keyboards and displays can be either dumb terminals, such as manufactured by IBM or Wyse, or standard PC's using 486 processors or similar technology. More exotic but commonly available entry devices, such as OCR readers, touch screens, or voice recognition devices like those manufactured by Texas Instrument, can also be used. Printers can be laser, dot matrix, or line outputting devices.

The operating system software, programming languages, and database utilities used for data processing, storage, etc., are also known. The operating systems could be selected from UNIX, Windows, Windows NT, Solaris, OS/2, DOS, Macintosh System 7, MVS, etc. The programming language used for the application software, which performs all of the subsystem logic, including such tasks as pool balancing, calculating payouts, keeping totals, controlling inputs/outputs, etc., could be C, C++, Basic, or a variety of others. A database such as that supplied by Oracle, Sybase, Informix, or others will satisfactorily meet the needs of the system.

Communications among the various devices will depend upon the subsystems elected. In particular, intelligent devices within a local area can be connected by a local area network (LAN), such as that supplied by Novell Corp. or Banyan Corp., or by using such standard technologies as UNIXNET, DECNET or ARCNET. Dissimilar devices in a local or wide area could be connected, for example, by standard TCP/IP technology and low level devices could be RS232 units. File servers that are needed could be standard 486 or RISC based devices. Transmission among system elements can use Ethernet technology with standard Ethernet cards and 10BaseT lines, or token ring technology outside of common carrier domains. Standard high speed modems, multiplexors or direct digital transmission, such as by means of packet switching, can be used for long range transmission via common carriers. Using a system according to the present invention, a bettor could be in a casino connected via a LAN, at home and connected by modem through the common carrier system, en route and using mobile radio or cellular telephone, or in any location that has access to standard forms of communications.

System Operation

Figure 2:
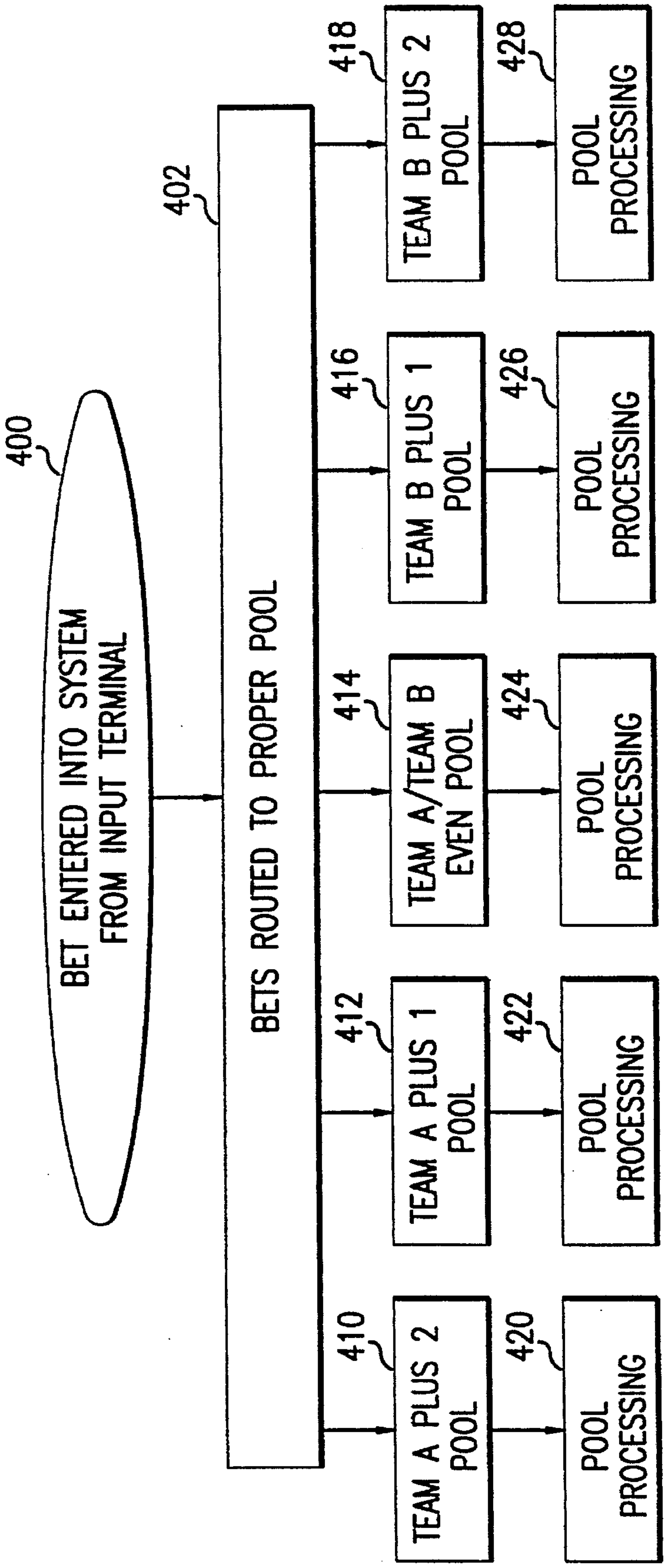
FIG. 2 is schematic flow diagram of pool processing in a preferred embodiment according to the present invention.

Central processing unit 300 maintains one or more pools for each event upon which bets are being accepted. Every event has a different pool for each handicap being offered. FIG. 2 is a schematic diagram showing an overview of the bet processing procedure in a sample arrangement of multiple pools. Those sports which do not use handicaps (baseball, boxing, etc.) are treated as if the handicap were zero and so only have one pool. Sports in which betting with handicaps is employed will have multiple pools.

For example, in basketball, with Team A playing Team B, if the house initially set the handicap at Team B plus 5 (Team B's score is increased by 5 points), a single pool would be set for all bets at the plus 5 handicap. Bets might also be accepted for pools at Team B plus 6, plus 7, plus 8, plus 9, plus 10, etc., and plus 4, plus 3, plus 2, plus 1, even money, Team A plus 1, etc. It should be noted that Team B plus 6, plus 7, etc. could have been stated as Team A minus 6, minus 7, etc.; they are equivalent.

The house may set up as many separate handicap pools as it determines will have player interest. The house preferably would also use its judgment and initially set odds associated with each team for each handicap pool. Alternatively, these initial odds could be determined by the system. For example, historical data could be kept on the final odds on a large number of events after pre-game wagering is completed (i.e., just before the event starts). These data on the final odds for each handicap which differed from the even money handicap by a fixed number of points could be averaged and used as the initial odds for the handicaps which differ from even money by a like number of points.

Multiple Pools

Regardless of how the odds on each handicap pool are initially set (by the system or the house), in events in which handicaps are used, one handicap pool would initially have nominal odds of even money. This would be the handicap at which the house deemed that both contestants would be equally likely to win the contest. The relationship among the odds in the various pools would be such that if the handicap for a pool required that a contestant score a greater number of points relative to his opponent for a wager on that contestant in that pool to be won, the odds on that contestant in that pool would be more favorable. Conversely, if a wager on a contestant in a pool could be won if that contestant scored fewer points relative to his opponent, the odds on that contestant in that pool would be less favorable.

Throughout this discussion, the nomenclature used for odds is the ratio "winnings/bet." For example, 110/100 means that a successful $100 bet returns $210 (the $100 bet plus a $110 winnings).

As an example, and using the previous case where the even money pool has Team B receiving a 5-point handicap, consider also pools with Team B receiving 6 points, 7 point and 4 points. For the pool with Team B receiving a 6 point handicap (Team B plus 6), the initial odds set on Team B might be 100/110 and on Team A 110/100. A successful bet of $110 on Team B would return $210, including the original $110 wager and a $100 winnings. Successful bets of $100 on Team A would also return $210, with the winnings in that case being $110. There might also be a pool at Team B plus 7 points, with the odds on Team B being 100/120, or a pool at Team B plus 4 points, with the odds on Team B being 110/100, and so forth.

The odds initially set for each point spread would be selected to induce a balanced book on bets on Teams A and B in each separate pool. As bets are received, the system adjusts the odds on each team in each pool to attempt to make the losing portion of the pool equal the winning portion, regardless of which team wins.

The difference in handicap between pools need not be 1 point; it could be 2, 3, 4, etc. points. Also, the spacings in handicap need not be equal. Pools could be Team A plus 3, plus 7, plus 13, etc.

Limiting House Financial Exposure

It is virtually impossible for the pool to be exactly balanced at all times. For example, the first bet will automatically unbalance the book. Similarly, if the book was balanced on the last bet, then it would be unbalanced on the penultimate bet. It is not necessary that the book be exactly balanced, but that the imbalance be less than some percentage of the pool. In that case, the house can guarantee that their exposure is no more than that percentage, which is an acceptable portion of the profit from their commissions. Alternatively, as will be apparent to those of skill in this art, a maximum dollar imbalance could be set.

In addition, the house might receive a windfall on the unbalanced pool if a team having an under-funded loss exposure were to lose. The house guarantees that its exposure does not exceed a maximum amount by changing the betting terms in the pool to induce bettors to wager on the side which is underfunded, thereby inducing balancing of the pool. In extreme cases, the house stops accepting bets on the underfunded side when the exposure limit is reached. With bets still being accepted on the other side, the pool will presumably tend to return to balance and bets could resume being taken on the contestant for which betting was suspended. In any case, the maximum exposure can be assured.

House Commissions

In sports betting, house commissions for brokering the transactions are traditionally collected as a share of the payout. For example, in an even money pool, you must bet $110 to win $100. So a total of $220 is wagered by both players each of whom hope to win $100. The successful player will receive $210 (his $110 plus $100 from the loser). The house will receive $10 of the $220 total. If the house rules treat as a draw the case in which a favorite wins by just the point spread, no commission is earned by the house in that case.

Another approach is for the house to charge a commission on each bet placed: for example, some percentage of each bet or a fee from a schedule. In that case the house collects equally from all equal bets, including those that result in a draw. For simplicity in the examples herein, the case where the house collects an equal percentage fee from all bets will be considered.

Pool Balance Monitoring

Once betting commences, the system constantly monitors the state of balance in all pools for all events on which bets are being accepted. This is done by summing all wagers, and also separately summing each wager multiplied by the odds in effect on that wager, for all bets made on one team in one pool. The first total (the sum of all wagers on one team in one pool) is the amount available to pay off winners should the other team win. The second total (the sum of each wager multiplied by the odds on that wager on one team in one pool) is the amount needed to pay off wagers on that contestant should it win. These two totals are referred to herein as the available and needed funds, respectively. For the book to balance, it is necessary for the available funds on one contestant to be equal to the needed funds on the other contestant.

Absent abrupt changes in the score during the contest (which may necessitate abrupt changes in the odds and/or handicaps), it is desirable that the betting terms in a pool vary smoothly. The two parameters that control the pace of variations in betting terms are the sizes of the increments in terms changes and the frequency of the changes. Because the system is monitoring the state of balance constantly, the data is available on a bet-by-bet basis. However, it is probably not necessary that the terms be changed that rapidly. By monitoring the balance of the book and the rate of change in the balance of the book as a function of the amount bet, the house can cause the odds and/or handicap to change as desired through the use of an algorithm (a set of rules that responds to inputs) it selects. Alternatively, the house could monitor the balance of the book and the rate of change in the balance of the book as a function of time and use an algorithm to change odds/handicap with that as an input. In addition to the amount bet, and time, the pool balance could be monitored as a function of other factors. The system would operate identically except for the factor used as the basis of measuring the rate of change in book balance.

Odds and Handicap Changing Algorithm Design Considerations

Assume that the house charges a commission of 10% to book each bet. Further, assume that the house's total cost of doing business with minimal profit is 4% of the total amount bet at a given level of activity. If the house wishes to ensure that it is never at risk, it would have to balance the book to within 6% of the total amount bet. In any case, the house would select a percentage within which it wished to maintain the book's balance and would not allow the imbalance to exceed that percentage. It would then decide on what fraction of that percentage it would allow the book to become unbalanced before it changed the terms. Then it would change the terms to attempt to bring the book back into balance whenever the imbalance changed successively by that percentage. This would be done using an algorithm that dictates the change in terms to be made for a given change in pool balance.

Terms Changing

As an example, the algorithm might recalculate the terms when the pool was out of balance by ½ of 1% of its total and the out of balance amount exceeded some minimum dollar amount (to handle potential rapid swings in the balance when betting first begins that do not represent large amounts of money). As another example, the algorithm might change terms in fixed size dollar increments no matter how often this is required (as arbitrarily set by the house), or every minute by the required size increment in the closest whole dollar amounts. In examples herein, betting terms will be changed when the pool imbalance changes successively by a percentage of the amount bet.

The algorithm also might require that the taking of wagers stop on a contestant when its payoff pool is, say, underfunded by 4%. There could also be special rules in effect near the end of a game, after a change in score, etc. All such considerations contribute to the construction of an algorithm the house might use.

Changes in the Score

Changes in the score during a contest are also input into the system. When the score changes, changes in the odds or handicaps can be made immediately. This is done to prevent a sudden burst of betting just after a score from bettors trying to enter a wager before the odds change.

For example, when the score changes, the algorithm could shift the odds among the various pools. (Odds shifting is an expedient to speed the balancing process; the odds would adjust themselves automatically due to the betting, but more slowly.) Suppose that the odds on the Team A plus 5 pool were 101/100, the Team A plus 6 pool were 100/102, and the Team A plus 4 pool were 104/100, etc. If Team B scored 1 point, the Team A plus 5 pool, which was 101/100, would become 104/100, which was the odds on the Team A plus 4 pool prior to Team B scoring. Similarly, the Team A plus 6pool would become 101/100, etc. For those pools which had no pool to receive odds from (in the above example, the Team A plus 4 pool, which has no Team A plus 3 pool from which to shift the odds in the event that Team B scores 1 point), the algorithm could adjust the odds using a pro-forma pool (a pool with odds but no bets) set up and maintained, including odds changes, by the system for that purpose.

As an alternative to changing the odds when the score changes, the handicap could change. For example, all pools could have their handicaps shift by an amount equal to and in a direction to negate the change in score. In other words, if Team A scored, Team B would have a like amount added to its existing handicap. So if Team B was plus 3 and Team A scored 3, Team B would then be plus 6. The handicap change need not equal the points scored, might only apply to scoring by an overfunded team, and the change in the handicap could be different at different times in the contest. Also, a combination of odds and handicap shifts could be used. Note, however, that to ensure proper monitoring of a pool imbalance, it is preferable that there should be only one pool for a given handicap. Should it develop that more than one pool exists with the same handicap, it is preferable that the pools be merged, new odds be calculated, and a new period be started. In order to effectuate proper balancing of the pool, an odds change may be necessary when there is a handicap change.

It might also happen that a score could become wildly unequal, such that there was no pool previously set for a point spread, which pool would then be needed. A new pool could then be opened which would be taken from one of the existing pro-forma pools.

An existing pool might also have become unbalanced to the point that the house would stop taking additional bets on one side of the wager. Betting on that contestant could be reopened if subsequent bets on the other contestant reversed the balance of the pool and returned it to a condition in which it was within a range of balance that the house allowed.

Measuring Pool Balance

As noted previously, the relationship between available and needed funds gives the state of balance of the book. For a particular contestant, the available and needed sums can be expressed as an imbalance percentage equal to the available funds minus the needed funds, divided by the amount bet on both contestants, all multiplied by 100 to turn it into a percentage. Put algebraically:

$$P=[(A-N)/B]\cdot 100,$$

where P=percentage imbalance of the pool, A=available funds, N=needed funds, and B=amount bet on both contestants.

When P is zero, the pool is in balance. If the pool balance for a contestant is such that more funds are needed than are available, the percentage imbalance is negative, indicating that the book is underfunded for this contestant. If this contestant were to win, the house has a potential liability, which is equal to the dollar amount of the imbalance. Conversely, if the pool balance for a contestant is such that less funds are needed than are available, the percentage imbalance is positive, indicating that the book is overfunded. If this contestant were to win, the house has a potential windfall, which also equals the dollar amount of the imbalance.

All pools start in balance. They become unbalanced because the sums bet on the opposing teams, multiplied by their respective odds, cause the needed and available payoff amounts to depart from equality. The extent of the departure from equality indicates how the terms should change to reestablish balance. Consider, for example, that a departure from balance of $1,000 over $10,000 in bets (10%) would indicate the need for a larger change in terms than $1,000 over $1 million (0.1%). Furthermore, because changes in terms only seek to influence the betting patterns of the players in the hope that further wagering will balance the book, it is necessary to monitor how a change affects the pool balance to determine if additional changes are needed to bring the pool into balance.

The most significant part of the algorithm is establishing a relationship between the pool imbalance and terms changes. That relationship is used to change the terms in view of the pool imbalance in order to encourage betting that will balance the pool ("balance the book"). It is also desirable, to encourage orderly betting, that changes in betting trends which throw the pool out of balance are identified as rapidly as possible so that the proper odds or handicap change to balance the pool can be made on a timely basis, in order to ensure that terms changes occur smoothly rather than abruptly.

The balance of the pool is monitored continuously over its life. It is also simultaneously monitored during intermediate short term periods. The overall pool imbalance for a contestant is expressed as $P_B$, the unbalanced dollar total on one contestant as a percentage of the total dollar amount of all wagers in the pool on both contestants. Thus:

$$P_B=[(A-N)/B]\cdot 100$$

where $P_B$=overall percentage pool imbalance, A=total dollars available, N=total dollars needed, and B=total dollars bet.

To monitor short term changes in pool balance, a second variable, $P_b$, which is the unbalanced dollar total added on one contestant as a percentage of the total dollar amount of all wagers added to the pool on both contestants since the last terms change. Therefore, $$P_b=[(a-n)/b]\cdot 100$$

where $P_b$=percentage pool imbalance since the last terms change, a=available dollars since last terms change, n=needed dollars since last terms change, b=total bets since last terms change.

Game Clock

In those sports in which a game clock is used, it is an important factor in balancing the book. As the game proceeds, there is less time left to effectuate a change in the book balance, so larger terms changes become necessary. The same is true for contests using innings, rounds, or other contest divisions. Also, the time remaining in a contest influences the cessation of betting. The union of the direction in which the book balance is moving and the time remaining determines when wagering on a contest should be stopped. When the end of the contest is near, as long as the book is moving toward a balance, betting can continue. If the book starts departing from balance, betting may have to be stopped because there might not be sufficient time left to bring it back into balance.

The algorithm that is used to balance the pool is thus preferably a function of these four measures: (1) the overall pool balance (expressed as an imbalance percentage, $P_B$); (2) the short term pool balance (also expressed as an imbalance percentage, $P_b$), (3) the ratio of these two pool balances ($p_b/P_B$), and (4) the relationship of the game clock with pool balance. Score changes can also affect betting terms changes that seek to prevent the pool from becoming unbalanced (or to make the pool more unbalanced).

The preceding represent examples of the predetermined criteria that may be used in an algorithm incorporated in the present invention. Other predetermined criteria might allow for the algorithm to change automatically (a "self-correcting" algorithm) in response to certain conditions, or to change based on input by a user or the house (an "interactive" algorithm).

System Logic Design

Figure 3:
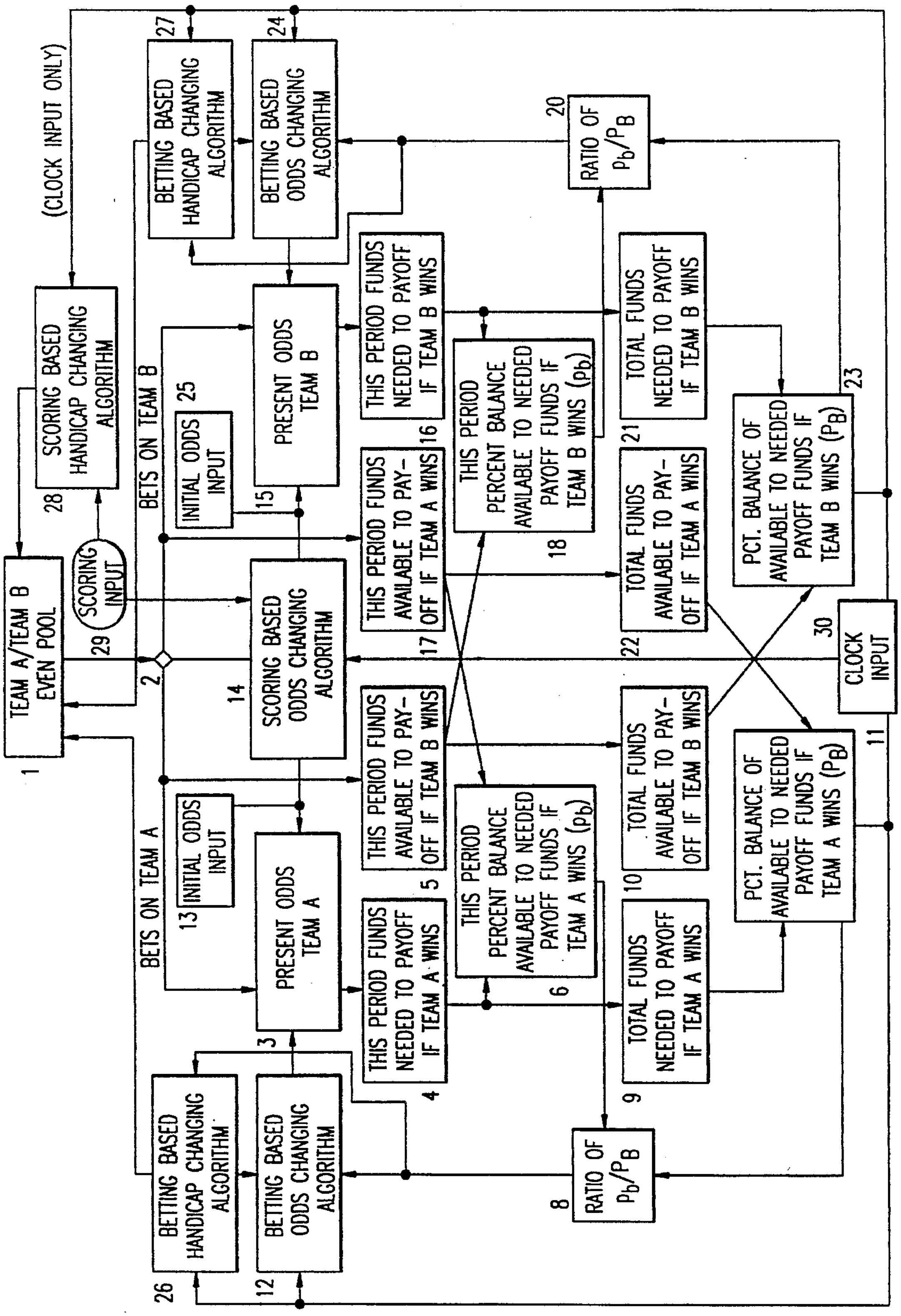
FIG. 3 is a generalized logic design diagram of pool processing according to the present invention.

FIGS. 2 and 3 show an overview of the logic used to balance the book in a preferred embodiment according this invention.

The system logic in the preferred configuration operates in the following manner. The initial terms for each wagering pool in each event for which bets are being accepted are input to and stored by the system. The terms are a handicap and the odds for that handicap. A single betting pool has a present handicap and associated odds for each of the two contestants (team or individual) in the event.

As shown schematically in FIG. 2, bets that are entered into the system at block 400 through the various local and remote input terminals (in discrete dollar amounts within a prescribed range) are routed to the proper pool at block 402. In the example shown in FIG. 2, separate pools are maintained for Team A plus 2 at block 410, Team A plus 1 at block 412, Teams A and B even money at block 414, Team B plus 1 at block 416, Team B plus 2 at block 418, Bets on each contestant follow separate but identical logic paths through the system for pool processing, as shown at blocks 420, 422, 424, 426, and 428.

The balancing of the book, referred to as pool processing in FIG. 2, is shown generally in the logic design diagram of FIG. 3, which depicts logic operations performed by software and/or hardware. Only one pool is presented in FIG. 3; all pools are preferably treated identically. If a contest does not use handicaps for wagering, there will be only one pool. The handicap for the pool in FIG. 3 is initially set to equality.

Starting at the top of the figure, the input of changes in the score as they occur during the course of the event is shown at block 29. This is entered into the system as an input at blocks 28 and 14, the scoring-based handicap and scoring-based odds changing algorithms. The status of the game clock in sports in which it is used (basketball, football, etc.) or other game progress measure (innings, periods, etc.) is also input, at block 30.

The wagers are divided at block 2 into two paths, one for each contestant. Each bet passing though the system is processed identically. In FIG. 3, two teams, A and B, are hypothesized and the bets on each team follow parallel but identical logical paths.

Blocks 13 and 25 depict the inputs for the initial odds on each respective contestant. For each bet the system proceeds to block 3 or 15, as appropriate, where the amount of the bet is multiplied by the present odds to determine the funds needed to pay off this bettor if this team wins. This product is then summed for the short term monitoring period at blocks 4 and 16 to determine the total amount needed to pay off the winners for bets made during this period on this contestant. The bets made on the two contestants are also routed to blocks 5 and 17 in parallel with blocks 4 and 16 where they are summed to determine the funds accumulated during this period that are available to pay off the winners if the other contestant were to win. The outputs from processing at block 4, the funds needed to pay off the winners for this period, and at block 17, the funds available this period to pay off winners, are compared at block 6, and identically, the outputs from processing at blocks 5 and 16 are compared at block 18. This comparison is made using the equation $$p_b=[(n-a)/b]\cdot 100$$

defined previously. This gives the short term percentage imbalance. The inputs to blocks 4, 5, 16 and 17 are also continuously routed to blocks 9, 10, 21 and 22, where they are added to the existing totals.

The total funds needed to pay off winners if Team A wins and the total funds available to pay off those winners, which are the sums measured from the start of betting in this pool, are accumulated by the system at blocks 9 and 22 respectively. Similarly, the same totals, should Team B win, are accumulated at blocks 10 and 21. The pool balance ($P_B$) is then calculated for Team A at block 11 from the totals in block 9 and block 22, and calculated for Team B at block 23 from the totals in block 21 and block 10.

The signed ratio, ($p_b/P_B$), of the short term percentage imbalance, from block 6, to the total pool percentage imbalance, from block 11, is then computed at block 8 (or at block 20 with data from blocks 18 and 23 for the parallel path). The data tracked at blocks 6, 18, 4, 5, 16, and 17 are then set to zero (at the end of the short term monitoring period), with the totals at blocks 6 and 18 being transmitted to blocks 8 and 20, respectively, prior to their being cleared to zero, but after blocks 8 and 20 are first set to zero. The data tracked at blocks 11 and 23 are simultaneously sent to blocks 8 and 20. The data from blocks 8 and 11 are transmitted to blocks 12 and 26, the betting-based odds changing algorithm and the betting-based handicap changing algorithm, respectively; similarly, the data from blocks 20 and 23 are transmitted to blocks 24 and 27. Blocks 8 and 20 are then reset to zero to measure the signed ratios after the next monitoring period. Any time there is a terms change, regardless of the reason, a new short term monitoring period commences, with the appropriate variables being set to zero.

The short term monitoring period used to calculate $P_b$ at blocks 6 and 18 is the period between terms changes for the total pool indicated at blocks 11 and 23. That is, when $P_B$ at blocks 11 and 23 meets the criteria to change terms, the $p_b$ is calculated for the period from the last change in $P_B$. As stated previously, the pool balance is monitored over the entire pool life and for the period between terms changes, to measure short term pool balance variations.

As an option, if the house wishes the odds and/or handicaps on the two contestants always to be reciprocal, e.g., 100/120 on Team A and 120/100 on Team B, etc., the odds and handicaps for both contestants could be controlled by one set of algorithms, for example, blocks 12 and 26, with the odds and handicap for the other contestant being set as the reciprocals.

The house may also have a manual override to make changes in the terms of the bets and decide whether or not bets will be accepted.

As a more specific example of the generalized description of pool processing depicted in FIG. 3, a preferred embodiment of a system and method according to the present invention utilizes a software module for pool processing as depicted in the flowcharts of FIGS. **4*a* and 4*b*. The system begins pool processing at block 100 and proceeds to block 113**, where system accepts input for the initial odds on each respective contestant. The initial odds may also be input in a software module separate from the pool processing module.

The system next proceeds to block 101, where the system waits to receive data regarding a bet or data indicating that the contest is over (clock=0) or that other conditions exist that will terminate betting. Such data is preferably handled by interrupt processing. Once such data is received, the system proceeds to block 200, where it is determined whether betting is terminated (e.g., clock=0). If so, processing continues to block 202, where the pool processing module stops execution (which may entail a return or jump to other software modules or code). If not, processing continues at block 102.

At block 102, the system determines whether it has received data concerning a bet on Team A. If not, the system proceeds via label B to block 254, depicted in FIG. 4*b*. If so, processing continues at block 204.

At block 204, the system determines whether or not a bet on Team A is allowed. If not (i.e., if betting is suspended), then processing continues at block 206, where a message is displayed to indicate that betting on Team A is not allowed, and then processing returns to block 101. If a bet on Team A is allowed, the system proceeds to block 105.

At block 105, the amount of the bet is added to the amount available for this period if Team B wins. (This period is defined as the interval since the last change in terms). The system then proceeds to block 110, where the amount of the bet is added to the total amount available if Team B wins. (The total amount is the amount pertaining to the entire contest.) Next, processing continues at block 103, where the amount needed for this bettor is calculated by multiplying the amount of the bet by the present odds on Team A. At block 104, the system adds the amount needed for this bettor to the amount needed for this period if Team A wins, and at block 109, the system adds the amount needed for this bettor to the total amount needed if Team A wins.

Processing then continues, as indicated by label C, to block 106, where the system calculates the dollar imbalance (a–n) and the percentage imbalance ($P_b$) for this period if Team A wins. At block 111, the system calculates the overall dollar imbalance (A–N) and the overall percentage imbalance ($P_B$) if Team A wins. Then the signed ratio ($p_b/P_B$) of the short term percentage imbalance to the total pool percentage imbalance is calculated at block 108. The system retrieves clock data at block 130, and then proceeds at block 112 to perform the betting-based odds changing algorithm. Processing continues at block 126, where the betting-based handicap changing algorithm is performed. At block 129, the system retrieves scoring data, and at blocks 114 and 128, respectively, the system performs the scoring-based odds changing algorithm and the scoring-based handicap changing algorithm. As an alternative or additional capability, interrupt processing or other means may be used to process immediately the scoring-based terms changing algorithms and effect any needed terms changes as soon as data regarding a scoring change is entered into the system.

The system then proceeds to block 208 to determine if performance of any of the terms changing algorithms indicated that one or more terms changes is needed. If not, processing continues to block 210; if so, the system proceeds to block 214.

At block 214, the system changes the terms according to the results of the one or more terms changing algorithms that indicate a change. Because a terms change indicates the start of a new period, the system sets to zero the amount needed for this period if Team A wins, the amount available this period if Team B wins, and the short term percentage imbalance if Team A wins ($P_b$) at blocks 216, 218, and 220, respectively. At block 222, the system determines whether the results of the terms changing algorithms indicate that betting on Team A should be allowed or suspended, and sets the status of betting on Team A accordingly (for example, by setting or clearing a binary flag). Processing proceeds to block 210.

At block 210, the system determines whether processing of the bet data must be performed for Team B. If so, the system proceeds, via label E, to block 118, depicted in FIG. 4*b*; if not, the system returns via label D to block 101.

Figure 4A:
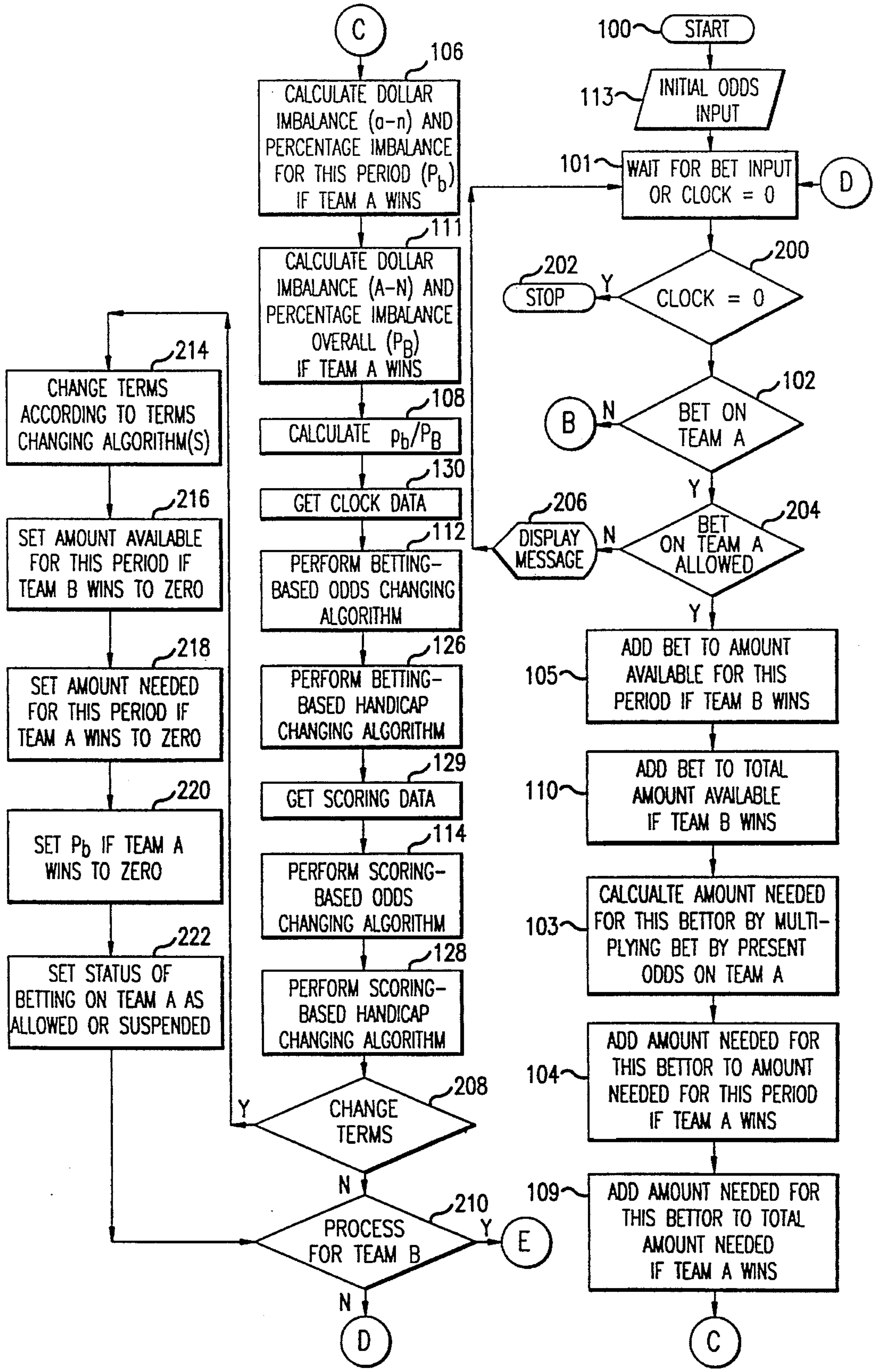
Figure 4B:
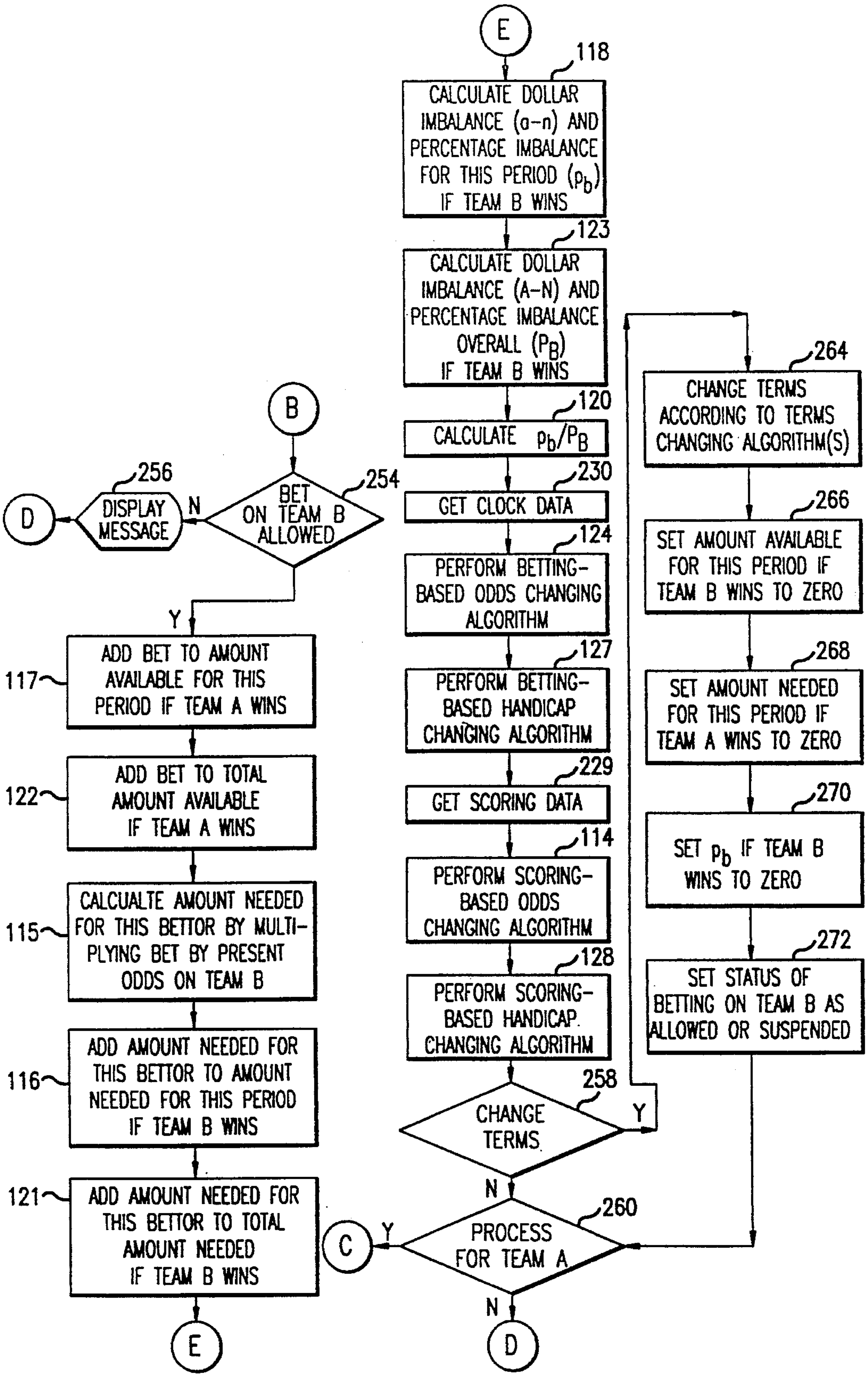

It should be noted that, in many circumstances, the house will use symmetrical terms for Teams A and B, in which case the processing depicted in FIG. 4*b* would be unnecessary. Instead of a decision at block 210, the system would simply return via label D to block 101.

As shown in FIG. 4*b*, at block 254, the system determines whether or not a bet on Team B is allowed. If not (i.e., if betting is suspended), then processing continues at block 256, where a message is displayed to indicated that betting on Team B is not allowed, and then processing returns via label D to block 101, depicted in FIG. 4*a*. If a bet on Team B is allowed, the system proceeds to block 117.

At block 117, the amount of the bet is added to the amount available for this period if Team A wins. The system then proceeds to block 122, where the amount of the bet is added to the total amount available if Team A wins. Next, processing continues at block 115, where the amount needed for this bettor is calculated by multiplying the amount of the bet by the present odds on Team B. At block 116, the system adds the amount needed for this bettor to the amount needed for this period if Team B wins, and at block 121, the system adds the amount needed for this bettor to the total amount needed if Team B wins.

Processing then continues, as indicated by label E, to block 118, where the system calculates the dollar imbalance (a–n) and the percentage imbalance ($P_b$) for this period if Team B wins. At block 123, the system calculates the overall dollar imbalance (A–N) and the overall percentage imbalance ($P_B$) if Team B wins. Then the signed ratio ($p_b/P_B$) of the short term percentage imbalance to the total pool percentage imbalance is calculated at block 120. The system retrieves clock data at block 230, and then proceeds at block 124 to perform the betting-based odds changing algorithm. Processing continues at block 127, where the betting-based handicap changing algorithm is performed. At block 229, the system retrieves scoring data, and at blocks 114 and 128, respectively, the system performs the scoring-based odds changing algorithm and the scoring-based handicap changing algorithm. Again, as an alternative or additional capability, interrupt processing or other means may be used to process immediately the scoring-based terms changing algorithms and effect and needed terms changes as soon as data regarding a scoring change is entered into the system.

The system then proceeds to block 258 to determine if performance of any of the terms changing algorithms indicated that one or more terms changes is needed. If not, processing continues to block 260; if so, the system proceeds to block 264.

At block 264, the system changes the terms according to the results of the one or more terms changing algorithms that indicate a change. Because a terms change indicates the start of a new period, the system sets to zero the amount needed for this period if Team B wins, the amount available this period if Team A wins, and the short term percentage imbalance if Team B wins ($P_b$) at blocks 266, 268, and 270, respectively. At block 272, the system determines whether the results of the terms changing algorithms indicate that betting on Team B should be allowed or suspended, and sets the status of betting on Team B accordingly (again, for example, by setting or clearing a binary flag). Processing proceeds to block 260.

At block 260, the system determines whether processing of the bet data must be performed for Team A. If so, the system proceeds, via label C, to block 106, depicted in FIG. 4*a*; if not, the system returns via label D to block 101, also depicted in FIG. 4*a*.

Illustrative Algorithm

The algorithm which controls the changing of the odds and/or handicaps as the pool balance varies comprises a criterion which determines when the odds or handicap are to be changed and a measure which relates those changes to pool balance changes. For illustration, a sample of the type of algorithm which might be used is given below. It should, however, be stressed that there is no algorithm which is optimal in all cases. In a given environment at a given time, one algorithm might bring the pool more rapidly to balance than another. In other houses or for other sports, etc., others might be more suitable. The development of an algorithm is a process which is based upon experience in a specific environment. It might well need adjustment for greater efficiency over time and for different types of contests. This invention will operate with virtually any algorithm provided that it moves the odds or handicap in a direction that induces a betting pattern which moves the book toward balance. A specific algorithm is not a part of the invention.

Developing the Algorithm

Suppose that, based upon an analysis of its costs, the house decides that the maximum loss exposure from an unbalanced pool it wishes to accept is 4% of the total of all bets placed. Therefore, when the pool on one contestant is underfunded by 4%, since the house will lose that percentage of the total amount bet if that contestant wins, the house stops accepting wagers on that contestant. However, the pool was initially in balance (no bets had been placed yet). Before the pool imbalance reaches 4%, it will have had to pass through being unbalanced by lesser amounts, e.g., ½% 1%, 2%, etc. As these intermediate states are reached, the betting terms will be changed to induce wagering in a manner which will bring the pool into balance.

In this example, the house decides that it wishes to change the terms whenever the pool imbalance changes by ½% of the bets placed so that terms changes will be relatively small. It also wants to change terms when the dollar imbalance changes by $25,000, even if that happens prior to the pool percent imbalance changing by ½%. Further, to prevent a short run of bets on one contestant from triggering a terms change, the house sets a minimum dollar imbalance before a change is made at $1,000.

A change in terms will be made the first time and each subsequent time that the imbalance in the pool changed by ½% (i.e., a pool imbalance step of ½%). Thus, if the pool percentage imbalance were to go from 0 to +½% to +½% to +½% to 0 to ½% to 0, six terms changes would have been made (presuming that the dollar imbalance criteria were also satisfied). So, if the percentage imbalance went from +½% to +1% (more overfunded), the terms on the contestant would become less favorable (would go, for example, from 100/120 to 100/140 or from −3 points to −4 points). Similarly, if the percentage imbalance went from 0 to −½% (more underfunded) the terms would become more favorable (go, say from 100/100 to 120/100 or from +1 point to +2 points).

Sample Algorithm

Shown in Table 1 is a sample algorithm which relates pool balance changes to terms changes. The terms for each pool balance change are determined by five factors: (1) the pool imbalance step (in this example, ½%); (2) a fixed multiplier associated with each pool imbalance step (i.e., each ½% balance change), varying between 1.1 and 3.0; (3) the r multiplier, which is the magnitude (absolute value) of the ratio $p_b/P_B$; (4) t, a time factor, which is 1.1 in this example, is applied when the dollar imbalance in the pool does not reduce by ½ when an additional (5) k percent of the contest is completed.

The r multiplier, which the magnitude of $p_b/P_B$, compensates for sudden changes in betting patterns because such changes will increase the $p_b$ more rapidly than the $P_B$ and therefore the magnitude of r will increase. When the pool is moving toward balance, the sign of r will be negative (the signs of $p_b$ and $P_B$ are different). Since the other factors are sufficient to move the pool toward balance at the rate desired, when the ratio is negative, the r multiplier is set equal to 1. It is also set equal to 1 when betting on one team is suspended. When the sign of r is positive, the increased magnitude of r will drive the terms in a direction to induce betting that would move the pool toward balance. However, in this example, r is not allowed to exceed 3. In sum for this example, r has a minimum value of 1 and a maximum of value of 3.

The t multiplier is a function which relates the decrease in the pool imbalance to the percentage of the contest which is completed and the percentage which remains. The t multiplier can have different values or change at different rates (i.e., k percent is different) in different parts of the contest. In this example, during the first 80% of the contest, starting after 10% of the contest is completed, if the dollar imbalance in the total pool does not decrease by ½ in each ensuing 10% (k=10%) of the contest, the odds are multiplied by 1.1 (t=1.1) after each 10% of the contest is completed. After 80% of the contest is completed, if the dollar imbalance does not decrease by ½ in the ensuing 5% of the contest, the odds are multiplied by 1.1 after each 5% (k=5%) of the contest is completed. After 90% of the contest is completed, if the dollar imbalance does not decrease by ½ in the ensuing 2.5% (k=2.5%) of the contest, the odds are multiplied by 1.1 after each 2.5% of the contest is completed. Thus the t multiplier will always drive the pool dollar imbalance toward zero. The portion of the contest which has been completed can come from the game clock, or in contests which have other measures, e.g., innings, rounds, etc., from the percentage of the contest completed using these other measures.

As an additional function of the algorithm, if the $P_B$ on a contestant increases by ½% within the last 4% of the contest, betting on that contestant in the pool is suspended. Betting can be reinstated if the $P_B$ on the contestant were to decrease subsequently. This factor controls the cessation of betting on a pool. It prevents pool changes near the end of the contest from increasing house exposure.

The system allows the house to adjust the parameters for the algorithm. In this example the parameters would be the pool imbalance steps, the fixed multiplier terms changes per pool imbalance step, r, t, and k. In addition, further parameters could include handicap change per pool imbalance steps for score and percent book imbalance changes, and minimum and maximum dollar amounts for triggering terms changes.

Given in Table 1 below is the illustrative algorithm. Notice that the changes in odds (the changes in the fixed multiplier) are not equal between intervals. Notice also that after the pool imbalance increases substantially (at −3½%), the handicap changes, and then the house stops taking bets on that contestant if the imbalance increases further, to limit its exposure. Furthermore, during the course of the contest, as shown in the Additional Rules for the Algorithm, the handicap will start to change after a given level of scoring has taken place. In another algorithm, the odds change between pool imbalance steps (the fixed multiplier) could be constant. Also, it need not be symmetrical in the underfunded and overfunded directions. Or there could be another relationship, e.g., more handicap changes and smaller odds changes. It could even be interactive with, for example, the changes in odds between pool imbalance steps, depending on whether the previous intervals had all moved toward or away from balance, or had fluctuated, etc.

If, due to handicap changes made to balance the book, multiple pools end up with the same handicap, those pools may be merged into one.

The development of an algorithm is a heuristic exercise for a given environment and type of contest.

TABLE 1

| Pool Balance changes (%) | Odds | Other Changes |
|---|---|---|
| −3 ½ to −4 | | Stop taking bets on contestant |
| −4 to −3 ½ or −3 to −3 ½ | x/2.5y(r)(t) | Handicap becomes ½ point less favorable |
| −3 ½ to −3 or −2 ½ to −3 | x/2y(r)(t) | |
| −3 to −2 ½ or −2 to −2 ½ | x/1.7y(r)(t) | |
| −2 ½ to −2 or −1 ½ to −2 | x/1.5y(r)(t) | |
| −2 to −1 ½ or −1 to −1 ½ | x/1.3y(r)(t) | |
| −1 ½ to −1 or −½ to −1 | x/1.2y(r)(t) | |
| −1 to −½ or 0 to −½ | x/1.1y(r)(t) | |
| −½ to 0 or +½ to 0 | X/Y | |
| 0 to +½ or +1 to +½ | 1.1x(r)(t)/y | |
| +½ to +1 or +1 ½ to +1 | 1.2x(r)(t)/y | |
| +1 to +1 ½ or +2 to +1 ½ | 1.3x(r)(t)/y | |
| +1 ½ to +2 or +2 ½ to +2 | 1.5x(r)(t)/y | |
| +2 to +2 ½ or +3 to +2 ½ | 1.7x(r)(t)/y | |
| +2 ½ to +3 or +3 ½ to +3 | 2x(r)(t)/y | |
| +3 to +3 ½ or +4 to +3 ½ | 2.5x(r)(t)/y | |
| +3 ½ to +4 | 3.0x(r)(t)/y | |

Additional Rules for the

Algorithm Summarized in Table 1

1. x/y is the original odds before the start of betting on the pool.
2. The odds are always normalized to have a ratio relative to 100, e.g., 150/100 or 100/150. Therefore, the original odds, x/y, would be x=200, y=100 if the initial odds on the pool were 200/100. As the odds are multiplied by the proper factor when the odds step changes, the new odds are re-expressed as a ratio to 100.
3. Change terms if imbalance greater than $25,000.
4. Do not change terms until imbalance greater than $1,000.
5. After a score change, substitute odds being used for in pool with the odds from the pool whose handicap differs by the amount of the points scored, e.g., if team A is plus 6 points and team A scores 6 points, the odds from the A plus 0 pool will be substituted. For those pools which do not have operating pools from which to receive transferred odds, the house will set up pro-forma pools whose pro-forma odds will be kept updated by tracking the odds in operating pools, but having their odds offset by a factor. For example, if the operating pool with the highest handicap was A plus 8, and the lowest handicap was A plus 3, there would be pro-forma pools at A plus 9, 10, 11, 12, etc. and A plus 2, 1, 0, B plus 1, etc. As many would be maintained as would be needed at any given time to transfer odds. These pro-forma pools would also be the pools which could be opened if new pools were needed due to changing betting patterns after the start of betting. As an example of the factor which would multiply the odds from an operating pool, the first pro-forma pool might have all of its odds 20% higher than the last operating pool, the next one 30% higher, etc. Similarly, the proforma pools on the other end of the range of operating pools might have their odds 20%, 30%, 35%, lower. These factors will be developed from experience with the actual differences in odds between operating pools.
6. After 50% of the contest is completed, if an overfunded contestant scores, the underfunded contestant has its handicap made more favorable (the number of points it must score to win the wager is reduced) by ½ of the number of points scored by the overfunded contestant. After 95% of the contest is completed, the underfunded contestant receives a number of points equal to that scored by the overfunded one.
7. Do not transfer odds when a handicap change is made in response to a score. When the criterion for a handicap change is met, it takes precedence over the odds shift.

Additional Betting Transactions

A system and method according to the present invention can enable the house to handle a number of additional types of betting transactions. Following are examples.

Cashing Bets During the Contest

Wagers previously made can increase in value prior to the conclusion of the contest. For example, say that a wager was made on Team A when Team A was an even money bet. Should scoring after the game starts be such that Team A is now carrying odds of 1 to 2 (a $2 bet returns $1 if it wins), the even money bet is twice as valuable as the present 1 to 2 bet (assuming it is for the same bet amount); this is because both bets will pay the same amount, but the old even money bet cost half as much as a bet placed now, at the new odds. In theory, the player holding such an even money bet could sell it to a player wishing to place a 1 to 2 bet for the same bet denomination and pocket one half the bet, while giving the player purchasing the bet the same potential return. Similarly, a player who had placed a bet when a team was 2 to 1 (he wins $2 for each $1 bet) could have his bet depreciated in value on paper by half if the odds increased to 4 to 1 because his team is doing poorly. He might wish to sell his bet at 50 cents on the dollar to cut his potential losses if he no longer had faith in the team upon which he had wagered. A bet at a given point spread could also increase or decrease in value as the point spread changed.

With a system and method for balancing the book after a contest has begun, the house could accommodate all of the above cases of a player wishing to trade-in existing bets by "selling" them to new players. The "buying" bettor will thus replace the funds being taken from the pool by the "selling" bettor, with the seller taking or adding funds as required. The present invention can accomplish this by providing for transfers of a bet from one player to another, preferably with software that ensures that a transaction will occur only if it will not unbalance the pool. This would allow the cashing-in of a bet by a "seller" and the purchase of that bet by a "buyer". The house could charge an additional commission for this service.

Possibilities for Exotic Bets

A system and method according to the present invention can further expand the range of possible bets to include a number of different point spreads in addition to the one which was initially presumed to produce even odds. A large number of other bets can also be offered, using the same system and method to balance the book. Depending upon the sport, these other bets could include, as examples, such propositions as (1) which team will be ahead at the end of each quarter; (2) whether or not the next batter will get on base; or (3) whether or not the combined score of both teams will exceed a given amount (with the possibility of several combined totals offered in different pools to expand the range of bets offered). There could even be bets over a series of games, such as the World Series; for example, a bet on who will win the series could have the odds changing during a game, between games, during a subsequent game, and so on until the series ends with a winner.

A system and method according to the present invention also accommodates the placing of conditional bets and the conditional cashing of bets, which are similar to limit buy and sell orders in a stock exchange. Conditional bets are wagers that become effective if certain conditions obtain. For example, suppose that the current odds in a +3 point pool are 110/100. A conditional bet could be placed at odds of 130/100, such that if the odds in the pool were to become 130/100, the bet would become effective.

Conditional bets could be placed for a combination of conditions, such as odds, points, game time, etc. For example, a game time condition might be that the above-described 130/100 odds wager could only be placed before the game started. Conditional bets could also be canceled before they became effective.

Conditional cashing of bets during the course of a contest may also be accommodated by a system and method according to the present invention. One example would be that if the odds in a pool were to reach 100/140, a wager that had been placed at 100/100 would be cashed. Another example would be that if the team wagered upon fell behind by 6 points more than it was when the bet was placed, the bet should be cashed.

It will be understood by those skilled in the art that the foregoing represents merely sample embodiments of the invention and that a myriad of modifications and alternative implementations are possible without departing from the basic intent or scope of the present invention..

I claim:

1. A computer-based data processing system for maintaining a betting pool during a contest, the betting pool having certain fixed betting terms, comprising:

central processor means for processing data;

storage means for storing data;

first means for calculating an imbalance of the betting pool;

second means, responsive to the first means, for determining on the basis of predetermined criteria whether to change the certain fixed betting terms; and third means, responsive to the second means, for changing the certain fixed betting terms.

2. A computer-based data processing system for maintaining a betting pool during a contest, the betting pool having certain fixed betting terms, comprising:

central processor means for processing data derived from the betting pool;

storage means for storing data representative of the certain fixed betting terms;

first means for calculating an imbalance of the betting pool;

second means, responsive to the first means, for determining on the basis of predetermined criteria whether to change the certain fixed betting terms; and third means, responsive to the second means, for changing the certain fixed betting terms.

3. A system as claimed in claim 1 or 2, wherein the first means comprises means for calculating a total dollar imbalance of the betting pool.

4. A system as claimed in claim 3, wherein the first means further comprises means for calculating a total percentage imbalance of the betting pool.

5. A system as claimed in claim 4, wherein the first means further comprises means for calculating a dollar imbalance of the betting pool for a period less extensive than a total extent of the contest and for calculating a percentage imbalance of the betting pool for the period.

6. A system as claimed in claim 5, wherein the first means further comprises means for calculating a ratio of the percentage imbalance of the betting pool for the period to the total percentage imbalance of the betting pool.

7. A system as claimed in claims 1 or 2, further comprising:

fourth means for receiving data concerning time intervals elapsed during the contest; and fifth means for receiving data concerning scoring that occurs during the contest;

wherein the second means is further responsive to the fourth means and the fifth means.

8. A system as claimed in claims 1 or 2, wherein the certain fixed betting terms comprise odds of a first contestant winning over a second contestant.

9. A system as claimed in claims 1 or 2, wherein the certain fixed betting terms further comprise a handicap for a first or a second contestant.

10. A system as claimed in claims 1 or 2, wherein the certain fixed betting terms further comprise odds of a first contestant winning over a second contestant and a handicap for a first or a second contestant.

11. A system as claimed in claims 1 or 2, further comprising means for determining a present value for a bet and for allowing a first user to transfer the bet to a second user.

12. A system as claimed in claims 1 or 2, wherein the betting pool is one of a plurality of betting pools for the contest.

13. A system as claimed in claim 12, wherein one or more of the plurality of betting pools has other fixed betting terms that are different than the certain fixed betting terms of another of the plurality of betting pools.

14. A system as claimed in claim 13, wherein one or more of the plurality of betting pools represents a different type of bet from another of the plurality of betting pools.

15. A system as claimed in claims 1 or 2, further comprising means for determining on the basis of predetermined suspension criteria whether to suspend or terminate betting on one or more contestants.

16. A system as claimed in claim 15, further comprising terminal means, connected to the central processor means, for allowing a user to enter data into the system.

17. A system as claimed in claim 16, further comprising optical character recognition means, connected to said central processor means, for inputting data into the system.

18. A system as claimed in claim 17, further comprising printer means for printing data.

19. A system as claimed in claim 18, further comprising display means for displaying data.

20. A system as claimed in claim 19, further comprising television distribution means for distributing data representing television signals to the terminal means.

21. A system as claimed in claim 20, further comprising television distribution means for distributing data representing television signals to the display means.

22. A computer-based data processing system for maintaining a betting pool on a contest, the betting pool having certain fixed betting terms, comprising:

central processor means for storing the data derived from the betting pool;

storage means for storing the data derived from a betting pool and data representative of the certain fixed betting terms;

first means for calculating an imbalance of the betting pool, comprising means for calculating a total dollar imbalance of the betting pool;

means for calculating a total percentage imbalance of the betting pool; and means for calculating a dollar imbalance of the betting pool for a period less extensive than a total extent of the contest and for calculating a percentage imbalance of the betting pool for the period;

second means for receiving data concerning time intervals elapsed during the contest;

third means for receiving data concerning scoring that occurs during the contest;

fourth means, responsive to the first, second, and third means, for determining on the basis of predetermined criteria whether to change the certain fixed betting terms; and fifth means, responsive to the fourth means, for changing the certain fixed betting terms.

23. A computer-based data processing method for maintaining a betting pool on a contest, the betting pool having certain fixed betting terms, comprising the steps of:

(a) processing data regarding a wager made during the contest;

(b) calculating an imbalance of the betting pool; (c) determining on the basis of predetermined criteria whether to change the certain fixed betting terms; and (d) changing the certain fixed betting terms based on the determination made in step (c).

24. A computer-based data processing method for maintaining a betting pool on a contest, the betting pool having certain fixed betting terms, comprising the steps of:

(a) automatically processing data regarding a wager made during the contest;

(b) calculating an imbalance of the betting pool for the contest;

(c) determining on the basis of predetermined criteria whether to change the certain fixed betting terms; and (d) changing the certain fixed betting terms based on the determination made in step (c).

25. A method as claimed in claims 23 or 24, wherein step (b) comprises calculating a total dollar imbalance of the betting pool.

26. A method as claimed in claims 23 or 24, wherein step (b) further comprises calculating a total percentage imbalance of the betting pool.

27. A method as claimed in claims 23 or 24, wherein step (b) further comprises calculating a dollar imbalance of the betting pool for a period less extensive than a total the contest and for calculating a percentage imbalance of the betting pool for the period.

28. A method as claimed in claims 23 or 24, wherein step (b) further comprises means for calculating a ratio of the percentage imbalance of the betting pool for the period to the total percentage imbalance of the betting pool.

29. A method according to claims 23 or 24, further comprising, following step (b) and preceding step (c), the steps of:

(b)(i) receiving data concerning time intervals elapsed during the contest; and (b)(ii) receiving data concerning scoring that occurs during the contest.

30. A method according to claims 23 or 24, wherein the certain fixed betting terms comprise odds of a first contestant winning over a second contestant.

31. A method as claimed in claims 23 or 24, wherein the certain fixed betting terms comprise a handicap for a first or a second contestant.

32. A method according to claims 23 or 24, wherein the certain fixed betting terms further comprise the odds of a first contestant winning over a second contestant and a handicap for the first or the second contestant.

33. A method as claimed in claims 23 or 24, further comprising the step of determining on the basis of predetermined suspension criteria whether to suspend or terminate betting on one or more contestants.

34. A computer-based data processing method for maintaining one or more betting pools on a contest having two contestants, each of said betting pools having certain fixed betting terms for each of the contestants, comprising the steps of:

(a) displaying the certain fixed betting terms for each of the contestants;

(b) inputting data regarding a wager, made during the contest, on one of the contestants in one of said betting pools;

(c) measuring an imbalance of the one of said betting pools for which the wager is made;

(d) determining on the basis of predetermined criteria whether to change the certain fixed betting terms of the one of said betting pools for which the wager is made;

(e) changing the certain fixed betting terms of the one of said betting pools for which the wager is made based on the determination made in step (d) in order to induce a betting pattern that will tend to result in balancing the one of said betting pools for which the wager is made;

(f) determining whether to suspend wagering on one or both of the contestants; and (g) returning to step (a).

35. A computer-based data processing system for maintaining one or more betting pools on a contest having two contestants, each of said betting pools having certain fixed betting terms for each of the contestants, comprising:

central processor means for processing data derived from said betting pools;

storage means for storing data representative of the certain fixed betting terms for each of the contestants;

means for displaying the certain fixed betting terms for each of the contestants;

first means for inputting data representing a wager, made during the contest, on one of the contestants;

second means for measuring an imbalance of the one of said betting pools for which the wager is made;

third means for determining on the basis of predetermined criteria whether to change the certain fixed betting terms of the one of said betting pools for which the wager is made;

fourth means, responsive to the third means, for changing the certain fixed betting terms of the one of said betting pools for which the wager is made in order to induce a betting pattern that will tend to result in balancing the one of said betting pools for which the wager is made; and fifth means for determining whether to suspend wagering on one or both of the contestants.

36. A feedback control system for balancing one of one or more betting pools on a contest having two contestants, each of said betting pools having certain fixed betting terms for each of the contestants, by changing the certain fixed betting terms for said one of one or more betting pools to induce a betting pattern that will tend to result in balancing said one of one or more betting pools, comprising:

central processor means for processing data derived from said betting pools;

storage means for storing data representative of the certain fixed betting terms for each of the contestants;

means for displaying the certain fixed betting terms for each of the contestants;

first means for inputting data representing a wager, made during the contest, on one of the contestants;

second means for measuring an imbalance of the one of said betting pools for which the wager is made;

third means for determining on the basis of predetermined criteria whether to change the certain fixed betting terms of the one of said betting pools for which the wager is made;

fourth means, responsive to the third means, for changing the certain fixed betting terms of the one of said betting pools for which the wager is made in order to induce a betting pattern that will tend to result in balancing the one of said betting pools for which the wager is made; and fifth means for determining whether to suspend wagering on one or both of the contestants.

* * * * *